United States Patent
Muto

(10) Patent No.: US 6,262,680 B1
(45) Date of Patent: Jul. 17, 2001

(54) ROCKET TRAJECTORY ESTIMATING METHOD, ROCKET FUTURE-POSITION PREDICTING METHOD, ROCKET IDENTIFYING METHOD, AND ROCKET SITUATION DETECTING METHOD

(75) Inventor: Eiichiro Muto, Kakamigahara (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 09/352,337

(22) Filed: Jul. 13, 1999

(30) Foreign Application Priority Data

Aug. 3, 1998 (JP) .................................................. 10-219388

(51) Int. Cl.$^7$ ...................................................... G01S 13/58
(52) U.S. Cl. .......................... 342/74; 244/3.1; 244/3.11; 382/103; 356/3; 356/4.01; 342/62; 342/75; 342/76; 342/94; 342/95; 342/118; 342/147; 342/175; 342/195
(58) Field of Search .................................... 244/3.1, 3.11; 342/61–65, 73–81, 2, 89–103, 175, 195, 118, 126, 134, 139, 140, 147, 149–154; 356/3, 4.01, 3.01–5.15; 382/103

(56) References Cited

U.S. PATENT DOCUMENTS

| | | | |
|---|---|---|---|
| 5,491,645 | * | 2/1996 | Kennedy et al. .................. 342/95 X |
| 5,525,995 | | 6/1996 | Benner .................................... 342/90 |
| 5,960,097 | * | 9/1999 | Pfeiffer et al. .................... 382/103 |

OTHER PUBLICATIONS

Lee, Sou–Chen et al., Improved Trajectory Estimation of Reentry Vehicles from Radar Measurements Using On–Line Adaptive Input Estimator, Ieice Transactions on Fundamentals of Electronics, Communications and Computer Sciences, Sep. 1998, Inst. Electron. Inf. and Commun, Eng, Japan vol. E81–A, No. 9, pp. 1867–1876.

H. Huynh, "Filtrage Linéaire Adaptif en Présence D'Un Bruit D'Evolution De Variance Mal Connue," "Recherch Aerospatiale," (1979, No. 1, Jan.–Feb., pp. 11–22; Paris, France).

* cited by examiner

Primary Examiner—Bernarr E. Gregory
(74) Attorney, Agent, or Firm—Oliff & Berridge, PLC

(57) ABSTRACT

There is provided a rocket trajectory estimating method comprising the steps of: measuring a GLOS angle of a flying rocket a tracking system; passing the GLOS angle data through a batch filter to reduce noises; estimating a rocket trajectory on the basis of the GLOS angle data, the noises of which have been reduced; passing the resulting rocket trajectory data through a Kalman filter to reduce biases; and estimating the rocket trajectory again on the basis of the corrected GLOS angle data and the positional information of the tracking system. Thus, there is provide a rocket trajectory estimating method capable of reducing observation errors (noises and biases) of a tracking system of a passive ranging system, which does not have need of any laser range finders, to enhance the accuracy of rocket trajectory estimation.

7 Claims, 12 Drawing Sheets

ROCKET TRAJECTORY ESTIMATING METHOD, ROCKET FUTURE-POSITION PREDICTING METHOD, ROCKET IDENTIFYING METHOD, AND ROCKET SITUATION DETECTING METHOD

BACKGROUND OF THE INVENTION

1. Field of the Invention

The present invention relates to a method for estimating the true trajectory of a rocket, a method for predicting the future position of the rocket, a method for identifying the rocket, and a method for detecting the situation of the rocket, using a tracking system installed on the ground or mounted on various platforms such as aircraft, ships and other vehicles.

2. Description of the Prior Art

Estimation of a rocket trajectory is an effective technique for predicting the flight position of a rocket at an arbitrary time. The outline of typical estimation of the rocket trajectory using a passive ranging sensory system will be described. As shown in FIG. 1, a tracking system 1 is a passive ranging sensor system to acquire information on GLOS (Geometric Line of Sight) angles (elevation angle (EL) and azimuth angle (AZ)) as observation information by tracking a flying rocket 2. The positional relationship between the tracking system 1 and the rocket 2 is shown in FIG. 2. The rocket 2 flies from the left side to the right side in FIG. 2, i.e., from a launch point 3 shown by "△" to a drop point 4 shown by "○". It is defined that the radius vector of the tracking system 1 from the geocentric of the earth is a vector (R), and the radius vector of the rocket 2 is a vector (r). In addition, it is defined that the range between the tracking system 1 and the rocket 2 is a slant range (ρ). The trajectory of the rocket 2 is shown by the locus of the radius vector (r) of the rocket 2, i.e., an elliptical orbit 5 in FIG. 2. If the trajectory 5 is estimated, the position of the rocket 2 at an arbitrary time can be estimated. FIGS. 1 and 2 show the case where the tracking system 1 is mounted on an aircraft. When the tracking system 1 is settled on the ground, the aircraft is replaced with a building or the like on the ground.

As described above, the tracking system 1 mounted on the aircraft can obtain information on the GLOS angles (EL, AZ) as observation information by tracking the rocket 2. On this information, noises and biases are added as observation errors. When the tracking system 1 is mounted on the aircraft, positional information (R) of the tracking system 1 can be obtained from a navigation system or the like. Therefore, the flow of algorithm for estimating the trajectory of the rocket 2 is as shown in FIG. 3.

First, in a geocentric equatorial-plane-based inertial coordinate system shown in FIG. 4, a GLOS vector (L), which is a matrix in a radial direction of the rocket 2 viewed from the tracking system 1, is derived from observation information (EL, AZ) as shown by the following formula (1) (step 101). It is herein assumed that EL=α and AZ=β.

$$L(k) = \begin{bmatrix} \cos(\alpha(k))\cos(\beta(k)) \\ \cos(\alpha(k))\sin(\beta(k)) \\ \sin(\alpha(k)) \end{bmatrix} \quad (1)$$

Then, the radius vector (r) of the rocket 2 is derived as a solution of 8th order algebraic polynomials, which are simultaneous equations of geometric equations and Keplerian orbital equations, which are shown by the following formula (2) (step 102). It is herein assumed that the velocity and acceleration of the tracking system 1 are "0" for simplification.

$$r(k) = \rho(k)L(k) + R \quad \dot{R}(k) = \ddot{R}(k) = 0 \quad (2)$$

$$\ddot{r}(k) = -\mu_e r(k)/r(k)^3$$

$\mu_e$: gravitational constant

Then, the radius vector (r) of the rocket 2 is substituted to derive a slant range (ρ) by the following formula (3) (step 103).

$$L(k)\rho(k) + 2\dot{L}(k)\dot{\rho}(k) + (\ddot{L}(k) + \mu_e L(k)/r(k)^3)\rho(k) = -\mu_e R/r(k)^3 \quad (3)$$

Finally, these are used to calculate orbital elements to estimate the trajectory of the rocket 2 (step 104).

An example of simulation analysis for the accuracy of the above described trajectory estimation of the rocket 2 will be described with respect to supposed long range and intermediate range rockets, which fly along trajectories I and II, respectively, from the left side to the right side as shown in FIG. 5.

It is assumed that the flight range of the supposed long range rocket is $S_1$ km, and the maximum altitude thereof is $H_1$ km. It is also assumed that the flight range of the supposed intermediate range rocket is $S_2$ km, and the maximum altitude thereof is $H_2$ km. In addition, it is assumed that the tracking system 1 mounted on the aircraft is located at A kilometers forward from the drop point in order to detect the rocket in an early phase. Moreover, it is assumed that the accuracy of estimation is analyzed 150 s before the drop of the long range rocket after the rocket flies in the vicinity of the maximum altitude, and 150 s before the drop of the intermediate range rocket after the burnout thereof.

Then, using a lateral range of the tracking system 1 (a horizontal distance from a rocket trajectory plane) (D) as a parameter, simulation analysis is conducted. FIG. 6 shows the condition of analyses in the case that the tracking system 1 has tracked the intermediate range rocket 2. In FIG. 6, the axis of ordinates denotes the accuracy (E) of trajectory estimation, and the axis of abscissas denotes a period of time (T) until the rocket reaches the drop point. Furthermore, FIG. 6 also shows the trajectory of the intermediate range rocket 2 in order to facilitate better understanding of the results of analysis of the accuracy (E) of trajectory estimation.

The intermediate range rocket 2 flies along the elliptical orbit 5 from the left side to the right side. The tracking system 1 is located at A kilometers forward from the drop point and a lateral range (D) from the rocket trajectory plane 6, and tracks the intermediate range rocket 2. Assuming that the position of the rocket at a certain time is a position shown in FIG. 6, the accuracy of estimation at that time is plotted at a position of "☆" in FIG. 6. Since the intermediate range rocket 2 flies along the elliptical orbit 5, the results at the times are sequentially plotted on a broken line B.

FIG. 7 shows the results of the estimation analyses in the range of from $D_1$ km to $D_2$ km using the lateral range (D) as a parameter. In FIG. 7, the accuracy of trajectory estimation is distinguished by color. The colorless portion means that the accuracy is less than 2 km. The sprinkled portion means that the accuracy is 2 km or more. It can be seen from FIG. 7 that there are many portions having the accuracy of trajectory estimation of 2 km or more, so that the accuracy is not so good under the influence of observation errors.

FIG. 8 shows the condition of analyses in the case that the tracking system 1 has tracked the long range rocket 2. In FIG. 8, the axis of ordinates denotes the accuracy (E) of trajectory estimation, and the axis of abscissas denotes a period of time (T) until the rocket reaches the drop point. Furthermore, FIG. 8 also shows the trajectory of the long range rocket 2 in order to facilitate better understanding of the results of analysis of the accuracy (E) of trajectory estimation.

The long range rocket 2 flies along the elliptical orbit 5 from the left side to the right side. The tracking system 1 is located at A kilometers forward from the drop point and a lateral range (D) from the rocket trajectory plane 6, and tracks the long range rocket 2. Assuming that the position of the rocket at a certain time is a position shown in FIG. 8, the accuracy of estimation at that time is plotted at a position of "☆" in FIG. 8. Since the long range rocket 2 flies along the elliptical orbit 5, the results at the times are sequentially plotted on a broken line B.

FIG. 9 shows the results of the estimation analyses in the range of from $D_3$ km to $D_4$ km using the lateral range (D) as a parameter. In FIG. 9, the accuracy of trajectory estimation is distinguished by color. The colorless portion means that the accuracy is less than 2 km. The sprinkled portion means that the accuracy is 2 km or more. It can be seen from FIG. 9 that most of portions have the accuracy of trajectory estimation of 2 km or more, so that the whole accuracy is bad under the strong influence of observation errors.

As described above, in the typical rocket trajectory estimating algorithm, the accuracy of trajectory estimation of a rocket deteriorates under the influence of observation errors of the tracking system mounted on the aircraft. In addition, the accuracy of prediction of the future position of the rocket, and the accuracy of prediction of the drop time at the future position are not sufficient. Moreover, it is not possible to precisely estimate the true trajectory of the rocket, so that there is a problem in that it is difficult to identify the rocket by the comparison between trajectories. Therefore, in order to measure the slant range (ρ) between the aircraft and the rocket, the aircraft must have a very large laser range finder.

SUMMARY OF THE INVENTION

As described above, it is difficult for a passive ranging sensor system to estimate a rocket trajectory accurately under the influence of observation errors (noises and biases).

It is therefore an object of the present invention to eliminate the aforementioned problems and to provide a rocket trajectory estimating method capable of reducing observation errors (noises and biases) of a tracking system of a passive ranging system, which does not have need of the above described laser range finder, to enhance the accuracy of trajectory estimation of a rocket.

It is another object of the present invention to provide a rocket future-position predicting method, a rocket identifying method, and a rocket situation detecting method, which are based on the rocket trajectory estimating method.

The present invention uses the fact the rocket trajectory is invariable in the midcourse phase because no external forces work on the rocket. Kalman filter can estimate biases from observation data (EL, AZ) using the pseudo change of the rocket trajectory caused on biases. Therefore, by eliminating biases and reducing noises, it is possible to estimate the rocket true trajectory, the rocket present and future position, the rocket situation, and the rocket identification simultaneously.

In order to accomplish the aforementioned and other objects, according to one aspect of the present invention, a rocket trajectory estimating method comprises the steps of: measuring a GLOS angle of a flying rocket by a tracking system; passing the resulting GLOS angle data through a batch filter to reduce noises; estimating a rocket trajectory on the basis of the GLOS angle data, the noises of which have been reduced; passing the resulting rocket trajectory data through a Kalman filter to estimate biases, and correcting the GLOS angle data by eliminating the biases estimated by the Kalman filter; and estimating the rocket trajectory again on the basis of the corrected GLOS angle data (biases have been eliminated) and a positional information of the tracking system.

The tracking system may be an infrared tracking system of a passive ranging system. Preferably, the batch filter sequentially generates batch data, which are generated by a GLOS vector prepared from the GLOS angle data of the tracking system every time, by replacing the oldest data with the newest data every time, and the batch data are inputted to a least square filter to reduce noises. The rocket trajectory data passed through the Kalman filter may include a rocket trajectory observation information, an observation acceleration, and a sensitivity matrix. Preferably, the Kalman filter can estimate the biases on the basis of the pseudo change of trajectory.

According to another aspect of the present invention, a rocket future-position predicting method comprises the steps of: measuring a GLOS angle of a flying rocket by a tracking system; passing the resulting GLOS angle data through a batch filter to reduce noises; estimating a rocket trajectory on the basis of the GLOS angle data, the noises of which have been reduced; passing the resulting rocket trajectory data through a Kalman filter to estimate biases, and correcting the GLOS angle data by eliminating the biases estimated by the Kalman filter; estimating the rocket trajectory again on the basis of the corrected GLOS angle data (biases have been eliminated) and a positional information of the tracking system; and simulation-analyzing a track of the rocket flying along the finally estimated rocket trajectory to estimate a future position or future-position drop time of the rocket.

According to a further aspect of the present invention, a rocket identifying method comprises the steps of: measuring a GLOS angle of a flying rocket by a tracking system; passing the resulting GLOS angle data through a batch filter to reduce noises; estimating a rocket trajectory on the basis of the GLOS angle data, the noises of which have been reduced; passing the resulting rocket trajectory data through a Kalman filter to estimate biases, and correcting the GLOS angle data by eliminating the biases estimated by the Kalman filter; estimating the rocket trajectory again on the basis of the corrected GLOS angle data (biases have been eliminated) and a positional information of the tracking system; and outputting estimated values of orbital elements of the finally estimated rocket trajectory from the Kalman filter, and identifying the rocket by comparing the outputted estimated values of orbital elements with values of orbital elements of various rocket trajectories.

According to a still further aspect of the present invention, a rocket situation detecting method comprising the steps of: measuring a GLOS angle of a flying rocket by a tracking system; passing the resulting GLOS angle data through a batch filter to reduce noises; estimating a rocket trajectory on the basis of the GLOS angle data, the noises of which have been reduced; passing the resulting rocket trajectory data through a Kalman filter to estimate biases; and deriving an estimated value of true acceleration of the rocket on the basis an observation acceleration, which is included in the rocket trajectory data transmitted to the Kalman filter, and an estimated value of pseudo acceleration obtained by the Kalman filter, to detect a situation of the rocket on the basis of the estimated value of the true acceleration.

According to the rocket trajectory estimating method of the present invention, errors (noises and biases) of rocket observation information obtained by a tracking system can be reduced by the batch filter and the Kalman filter without the need of any laser range finders, so that the precise of rocket trajectory estimation can be improved. In addition, according to the rocket future-position predicting method of the present invention, the future position or future-position drop time of a rocket flying along a true trajectory estimated by the rocket trajectory estimating method can be easily estimated by analyzing the track of the rocket. Moreover, according to the rocket identifying method of the present invention, a rocket can be easily identified by comparing estimated values of orbital elements of the true trajectory of the rocket estimated by the rocket trajectory estimating method, with values of orbital elements of various rockets. In addition, according to the rocket situation detecting method of the present invention, an estimated value of true acceleration of a rocket can be derived from an observation acceleration of the rocket and an estimated value of pseudo acceleration in the rocket trajectory estimating method, and the situation of the rocket can be easily detected from the estimated value of true acceleration.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENTS

Referring now to the accompanying drawings, the preferred embodiments of a rocket trajectory estimating method, a rocket future-position predicting method, a rocket identifying method and a rocket situation detecting method, according to the present invention, will be described below. Furthermore, in the preferred embodiments, a tracking system is mounted on an aircraft.

Figure 1:
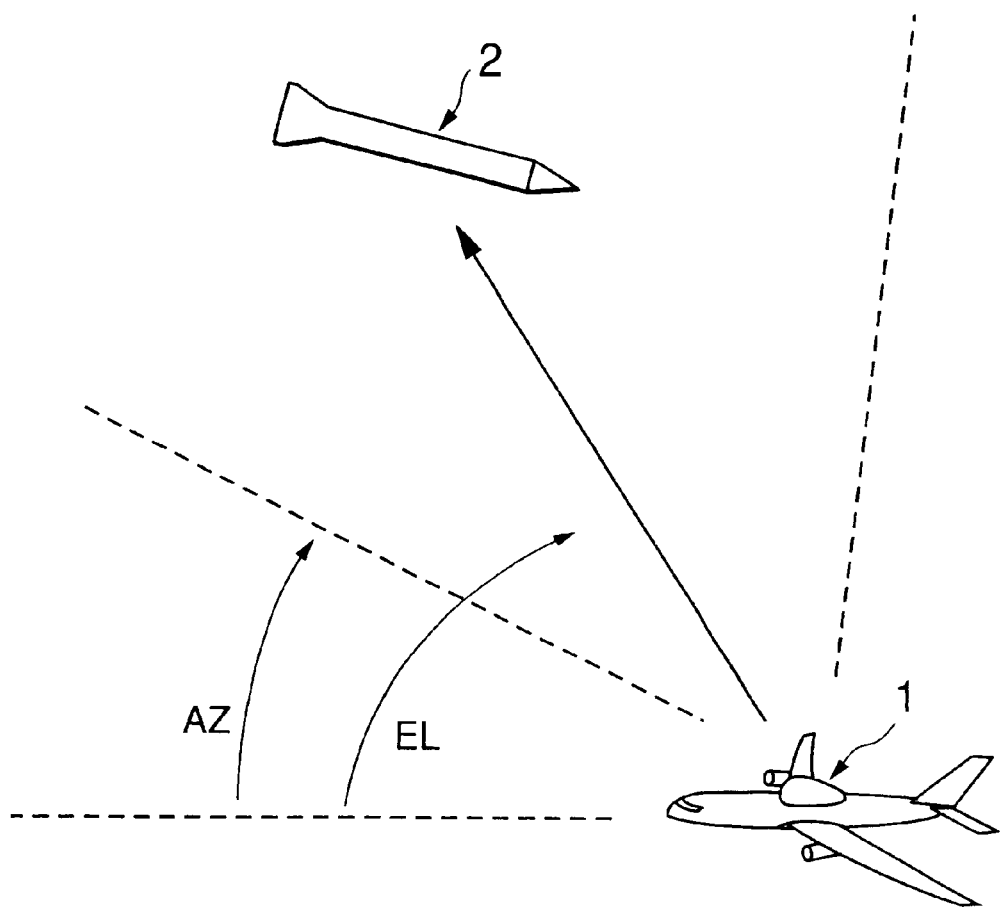
FIG. 1 is a schematic diagram for explaining the outline of a trajectory estimating method using a typical passive ranging sensor system.
Figure 2:
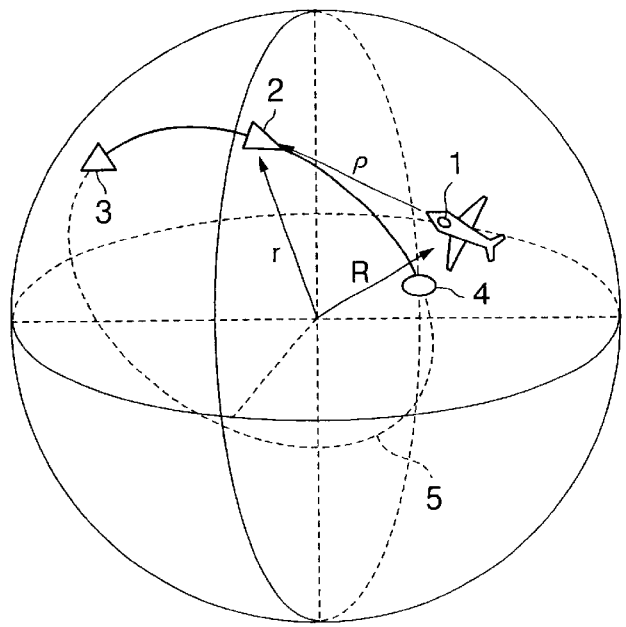
FIG. 2 is a schematic diagram showing the positional relationship between a tracking system and a rocket in the trajectory estimating method using the passive ranging sensor system shown in FIG. 1.
Figure 3:
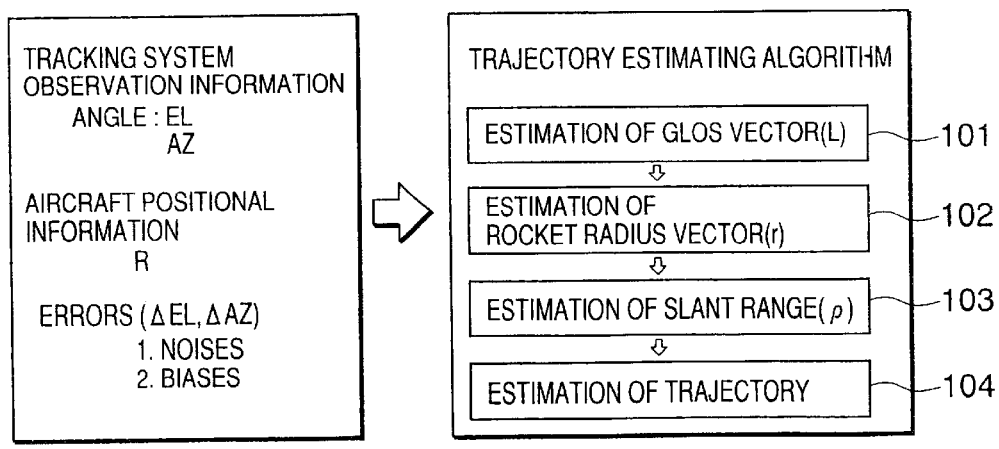
FIG. 3 is a chart showing the flow of a trajectory estimating algorithm.
Figure 4:
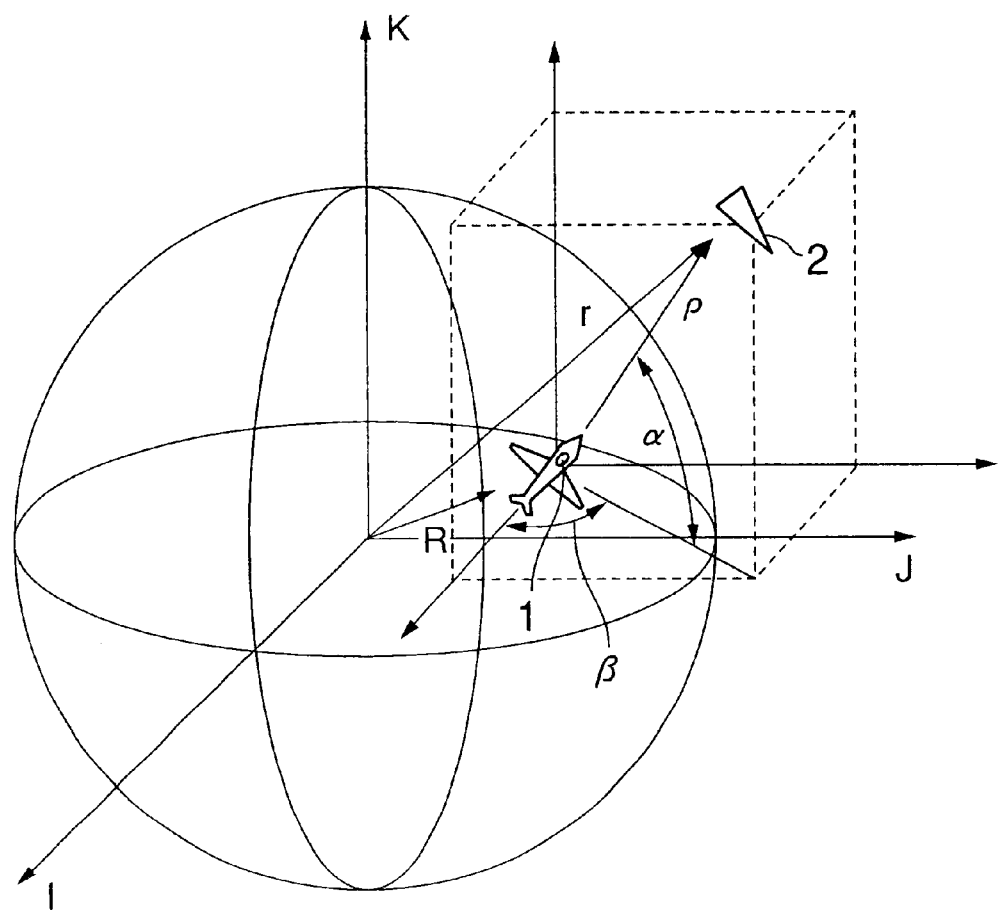
FIG. 4 is a schematic diagram showing the positions of a tracking system and a rocket in a geocentric equatorial-plane-based inertial coordinate system.

First, a rocket trajectory estimating method will be described. Information on GLOS angles (EL, AZ) is obtained as observation information by tracking a flying rocket 2 using an infrared tracking system 1 of a passive ranging sensor system, which is mounted on an aircraft, as shown in FIG. 2. This information includes ΔEL and ΔAZ as observation errors, so that noises and biases are added thereon. In the preferred embodiment, such observation information is processed according to a filter algorithm shown in FIG. 10. First, GLOS angle data pass through a batch filter 11 to reduce noises.

Figure 11:
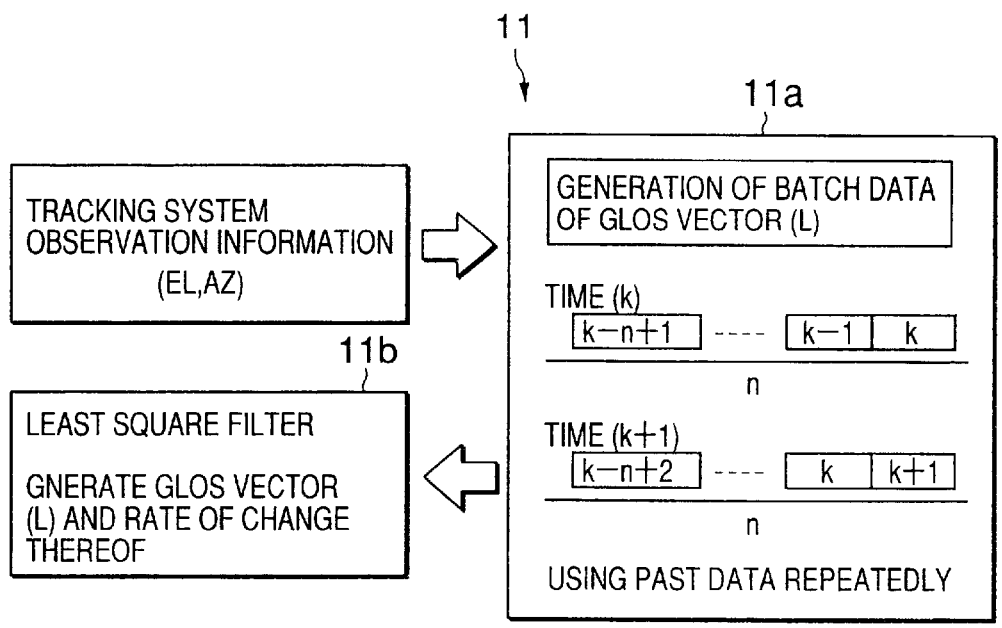
FIG. 11 is a chart showing the flow of a batch filter processing in a preferred embodiment of a rocket trajectory estimating method according to the present invention.

The batch filter 11 is a least square filter using a data group (batch data) generated by n past history data. The batch data are generated from a GLOS vector (L) prepared by the observation information (EL, AZ) of the tracking system 1 every time (k) as shown in FIG. 11 (see reference number 11a). The batch data are sequentially generated by replacing the oldest data with the newest data every time (k), so that certain time data are used repeatedly (n times) while shifting time. When the batch data are inputted to a least square filter 11b, noises are reduced, and a GLOS vector (L) and the rate of change thereof, which are necessary for trajectory estimation, are generated.

Figure 10:
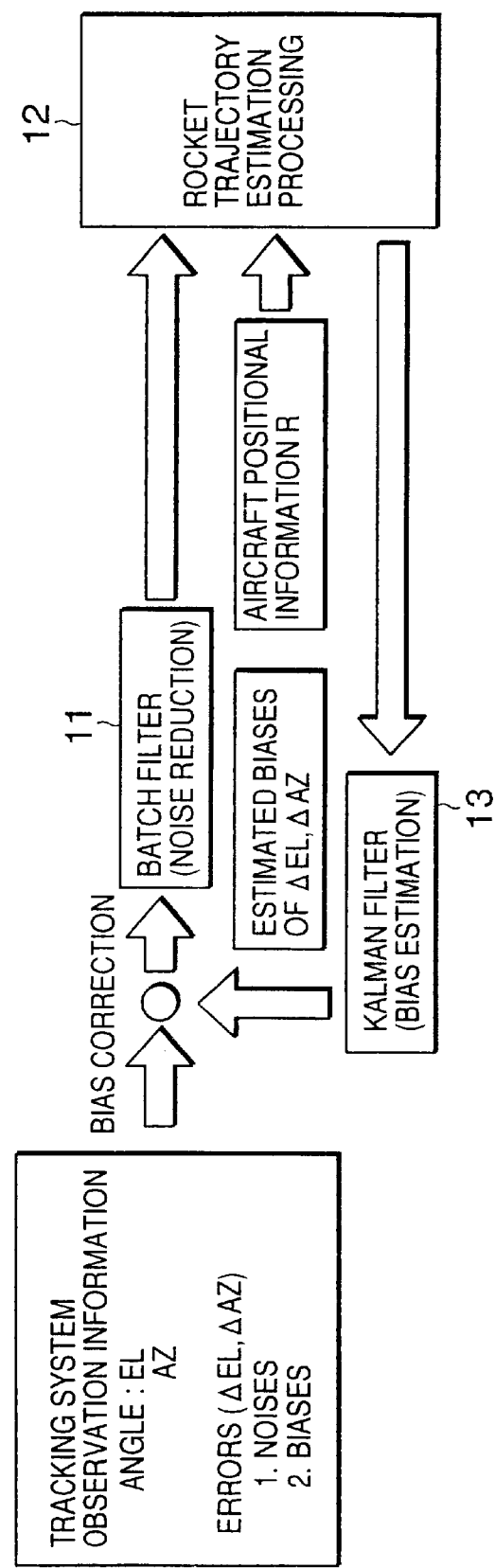
FIG. 10 is a chart showing the flow of a filter algorithm in a preferred embodiment of a rocket trajectory estimating method according to the present invention.
Figure 12:
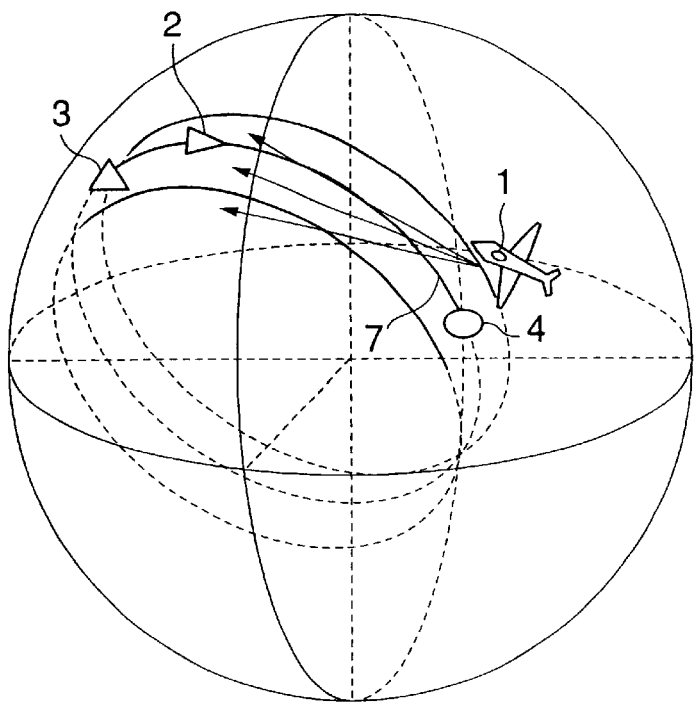
FIG. 12 is a schematic diagram showing the change of pseudo trajectory of a rocket based on the biases of a tracking system.

Then, a rocket trajectory estimating processing is conducted according to the above described trajectory estimating algorithm shown in FIG. 2, using the observation information wherein noises have been reduced (see reference number 12 in FIG. 10). Then, the rocket trajectory data (including biases) pass through a Kalman filter 13 to estimate biases as shown in FIG. 10. Although it is considered that the rocket trajectory is constant in a midcourse 7 wherein little external force is applied to the rocket 2 as shown in FIG. 12, the biases serving as observation errors change the estimated trajectory, so that the accuracy of estimation deteriorates. The Kalman filter 13 is introduced in order to estimate the biases on the basis of the change of the estimated trajectory in view of a constant true trajectory. The rocket trajectory data passing through the Kalman filter 13 include a rocket trajectory observation information, an observation acceleration, and a sensitivity matrix, which are given by the infrared tracking system 1 mounted on the aircraft.

Figure 13:
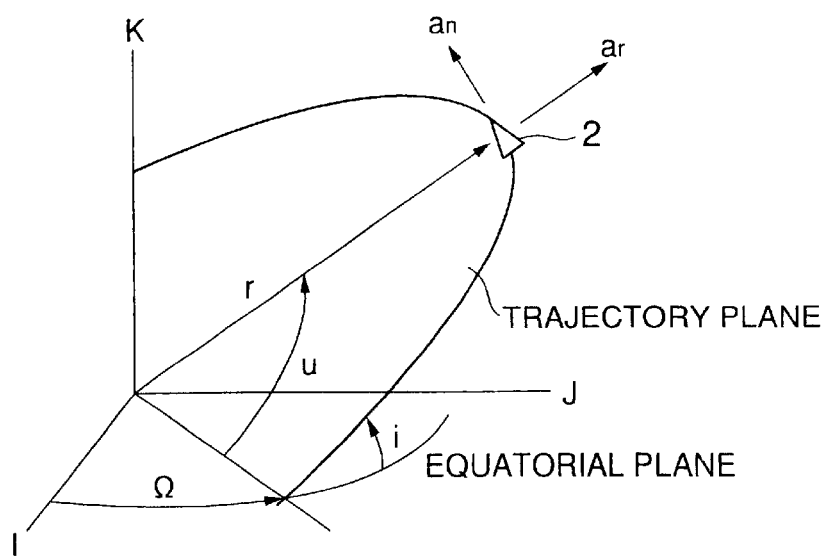
FIG. 13 is a schematic diagram for explaining the definition of orbital elements and acceleration in information inputted to a Kalman filter in a preferred embodiment of a rocket trajectory estimating method according to the present invention.

The information inputted to the Kalman filter 3 will be described. The rocket trajectory observation information comprises (six) quantities of trajectory state defined as shown in FIG. 13, and is defined as the following formula (4).

$$Z_{mes}(k) = [r(k)\dot{r}(k)u(k)\dot{u}(k)i(k)\Omega(k)]^T \quad (4)$$

Assuming that the normal component of the trajectory is <u>ar</u> and the tangential component thereof is <u>an</u>, the observation acceleration is defined as the following formula (5).

$$ar_{mes}(k) = \ddot{r}(k) - r(k)\dot{u}(k)^2 + u_e r(k)^2$$

$$an_{mes}(k) = r(k)\ddot{u}(k) + 2\dot{r}(k)\,\dot{u}(k) \quad (5)$$

These are estimated by the rocket trajectory estimating algorithm of the tracking system 1. The observation acceleration are rocket accelerations calculated by the quantities of state. Since the true value of the acceleration of the rocket 2 in the midcourse 7 is "0", pseudo accelerations based on the biases is outputted.

The sensitivity matrix is used for converting the estimated acceleration biases into angle biases ($\Delta EL$, $\Delta AZ$), and analytically or mathematically calculated as a minute change about the rocket estimated trajectory (see the following formula (6)).

$$\begin{bmatrix} \partial ar/\partial \Delta\alpha & \partial ar/\partial \Delta\beta \\ \partial an/\partial \Delta\alpha & \partial an/\partial \Delta\beta \end{bmatrix} \quad (6)$$

The filter equations of the Kalman filter 13 are as follows.
[Extended State Vector]

$$X(k) = [r(k)\dot{r}(k)u(k)\dot{u}(k)i(k)\Omega(k)\,\Delta ar(k)\Delta an(k)]^T \quad (7)$$

[Equation of State ]

$$X(k+1) = f(X(k),k) + Du_{mes}(k) + Bv(k)$$

$$u_{mes}(k) = [ar_{mes}(k)an_{mes}(k)]^T \; v(k): \text{State Noise} \quad (8)$$

[Observation Equation]

$$Z(k) = CX(k) + w(k) \; w(k): \text{Observation Noise} \quad (9)$$

[Estimated Biases]

$$\begin{bmatrix} \Delta\hat{\alpha}(k) \\ \Delta\hat{\beta}(k) \end{bmatrix} = \begin{bmatrix} \partial\alpha(k)/\partial ar(k) & \partial\alpha(k)/\partial an(k) \\ \partial\beta(k)/\partial ar(k) & \partial\beta(k)/\partial an(k) \end{bmatrix} \begin{bmatrix} \Delta\hat{ar}(k) \\ \Delta\hat{an}(k) \end{bmatrix} \quad (10)$$

Estimated Extended State
Vector (see the equation (7))

The filter equations (7), (8), (9) and (10) are formed as eighth order equations by adding the acceleration bias of second order ($\Delta ar$, $\Delta an$) to the quantity of trajectory state of sixth order equation.

The equation of state (8) is a non-linear equation described by the quantity of trajectory state. It is defined that the observation acceleration is an input, and v denotes state noises.

It is assumed that the observation equation (9) is able to observe the trajectory state of six order, and w denotes observation noises.

The Kalman filter 13 is designed to derive the estimated extended state vector by the sequential update of the covariance and gain using the usual nonlinear extended Kalman filter technique. The estimated acceleration biases ($\Delta EL$, $\Delta AZ$) are converted to estimated GLOS angle biases ($\Delta\alpha$, $\Delta\beta$) using the sensitivity matrix (see the equation (10)).

As described above, the values of biases are estimated by the Kalman filter 13, and the estimated angle biases are eliminated from the observation information (the GLOS angle data) of the tracking system 1. Then, the rocket trajectory is estimated again using the corrected GLOS angle data and aircraft positional information R measured by a navigation system mounted on the aircraft.

Figure 5:
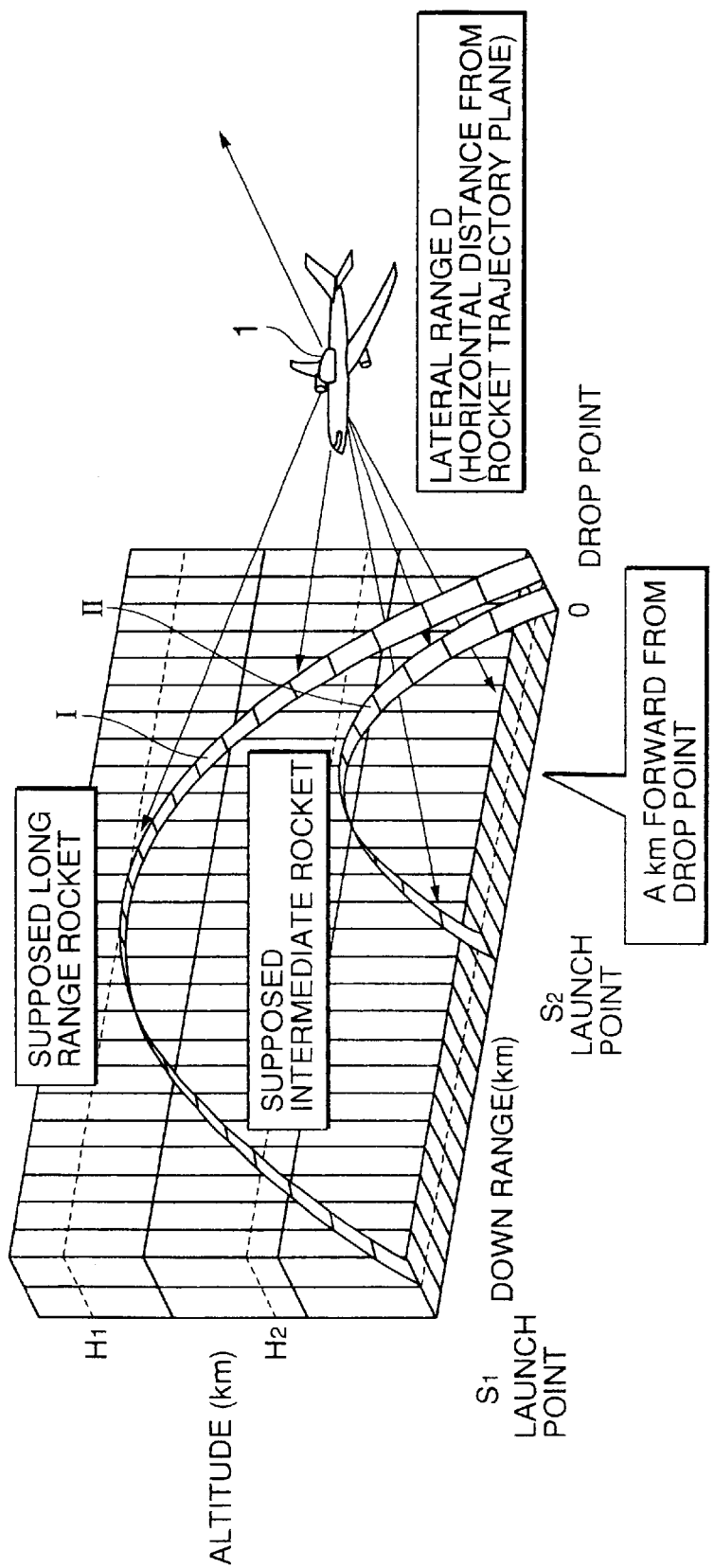
FIG. 5 is a schematic diagram showing the locations of a supposed rocket trajectory and a tracking system.
Figure 6:
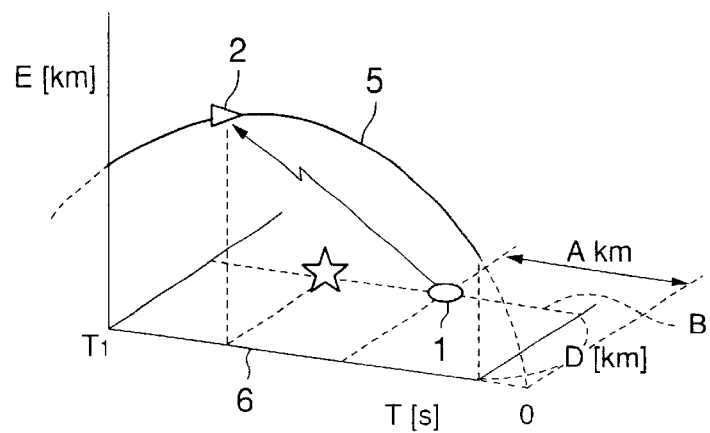
FIG. 6 is a schematic diagram showing a data processing method of a tracking system, which has tracked an intermediate range rocket.
Figure 7:
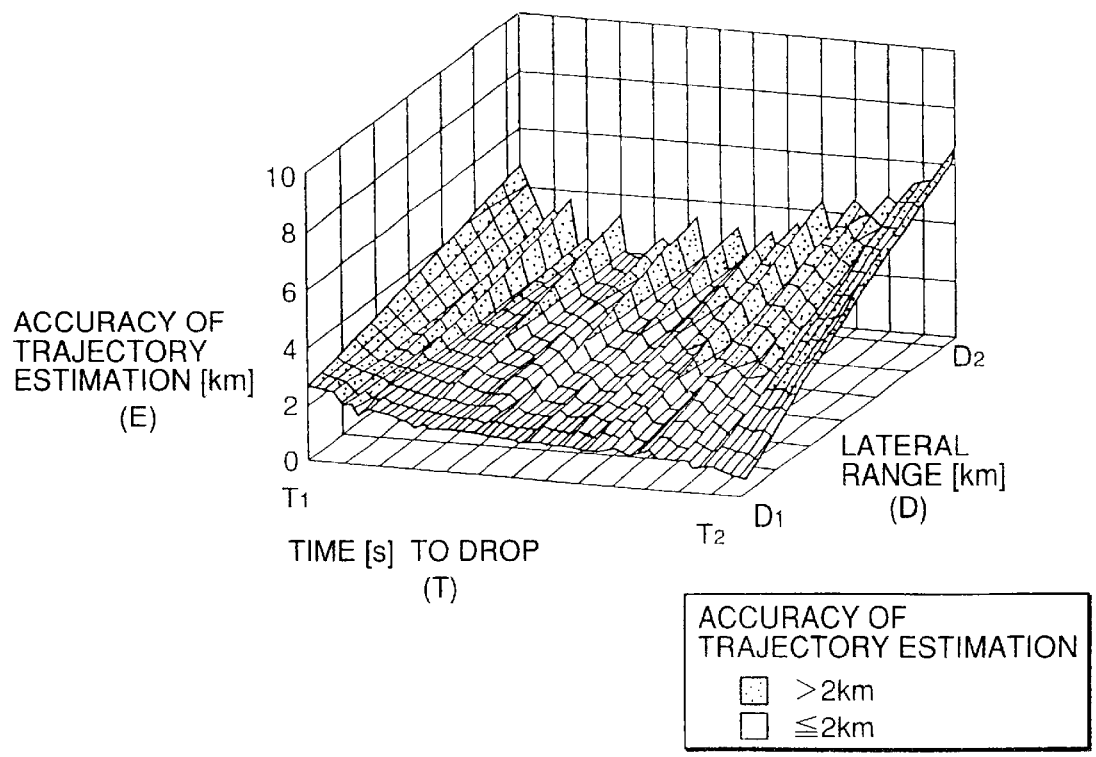
FIG. 7 is a diagram showing the results of estimation analyses of the accuracy of trajectory estimation of an intermediate range rocket.
Figure 8:
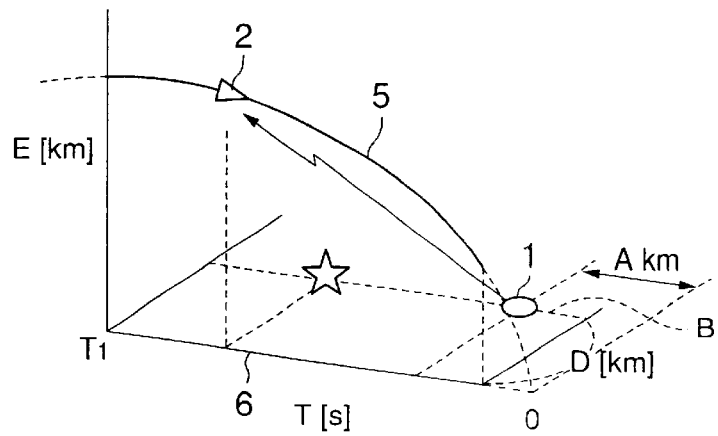
FIG. 8 is a schematic diagram showing a data processing method of a tracking system, which has tracked a long range rocket.
Figure 9:
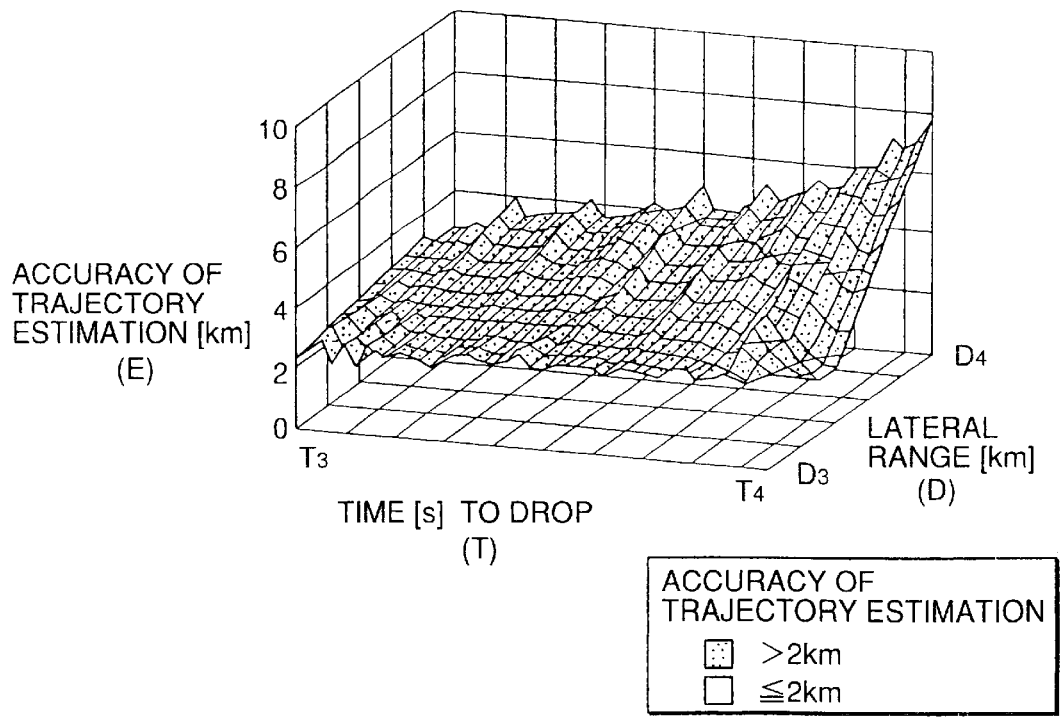
FIG. 9 is a diagram showing the results of estimation analyses of the accuracy of trajectory estimation of a long range rocket.

An example of simulation analysis for the accuracy of the above described trajectory estimation of the rocket 2 when reducing noises using the batch filter 11 and biases using the Kalman filter 13 will be described with respect to supposed long range and intermediate range rockets, which fly along trajectories I and II, respectively, from the left side to the right side as shown in FIG. 5.

Figure 14:
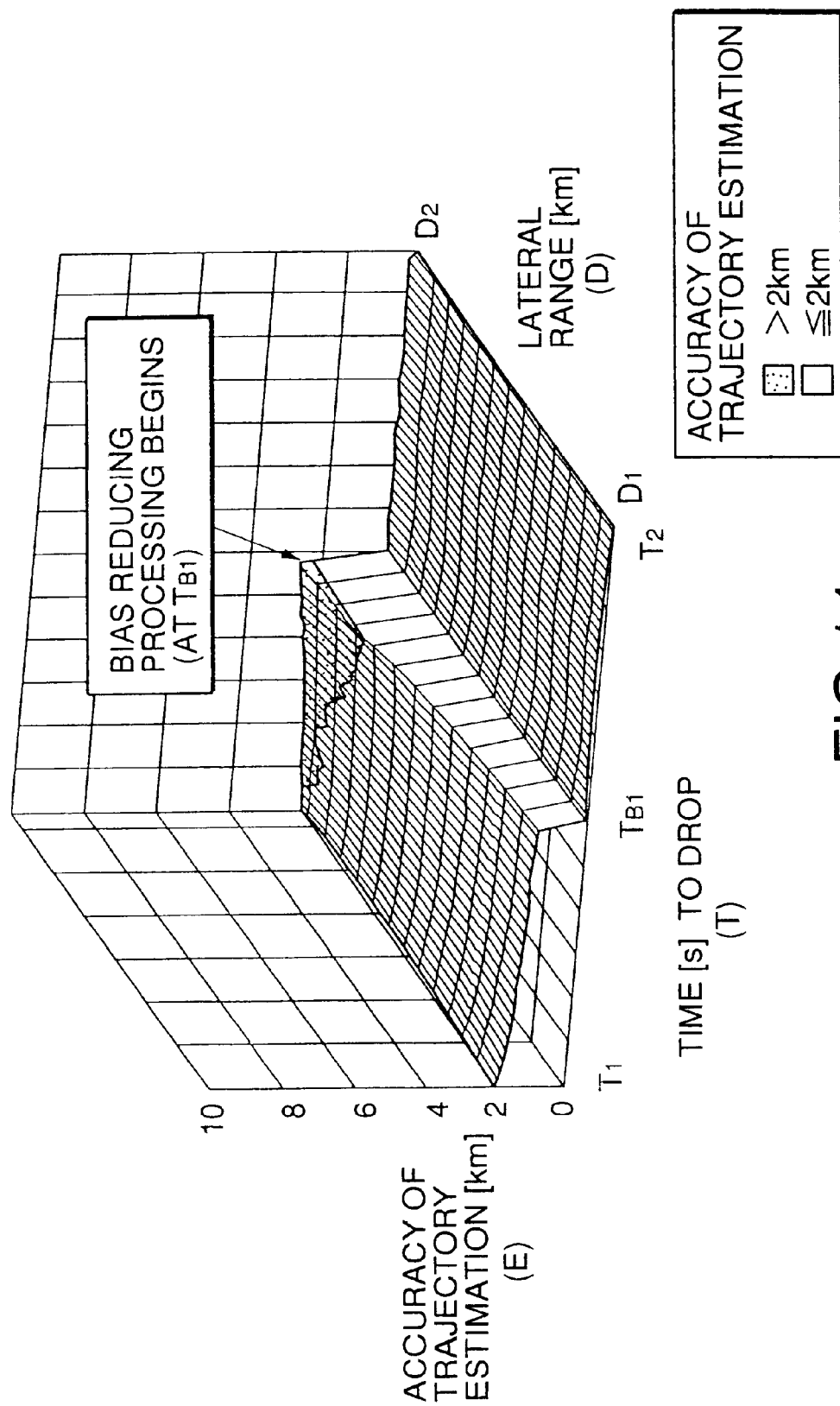
FIG. 14 is a diagram showing the results of estimation analyses of the accuracy of trajectory estimation of an intermediate range rocket using a preferred embodiment of a rocket trajectory estimating method according to the present invention.

FIG. 14 shows the results of the estimation analyses for the accuracy of trajectory estimation of the intermediate range rocket 2 in the range of from $D_1$ km to $D_2$ km using the lateral range (D) of the tracking system 1 as a parameter. In FIG. 14, the accuracy of trajectory estimation is distinguished by color. The colorless portion means that the accuracy is less than 2 km. The sprinkled portion means that the accuracy is 2 km or more. It can be seen from FIG. 14 that the accuracy of trajectory estimation is less than 2 km after the bias reducing processing begins at $T_{B1}$, so that the accuracy is considerably improved.

Figure 15:
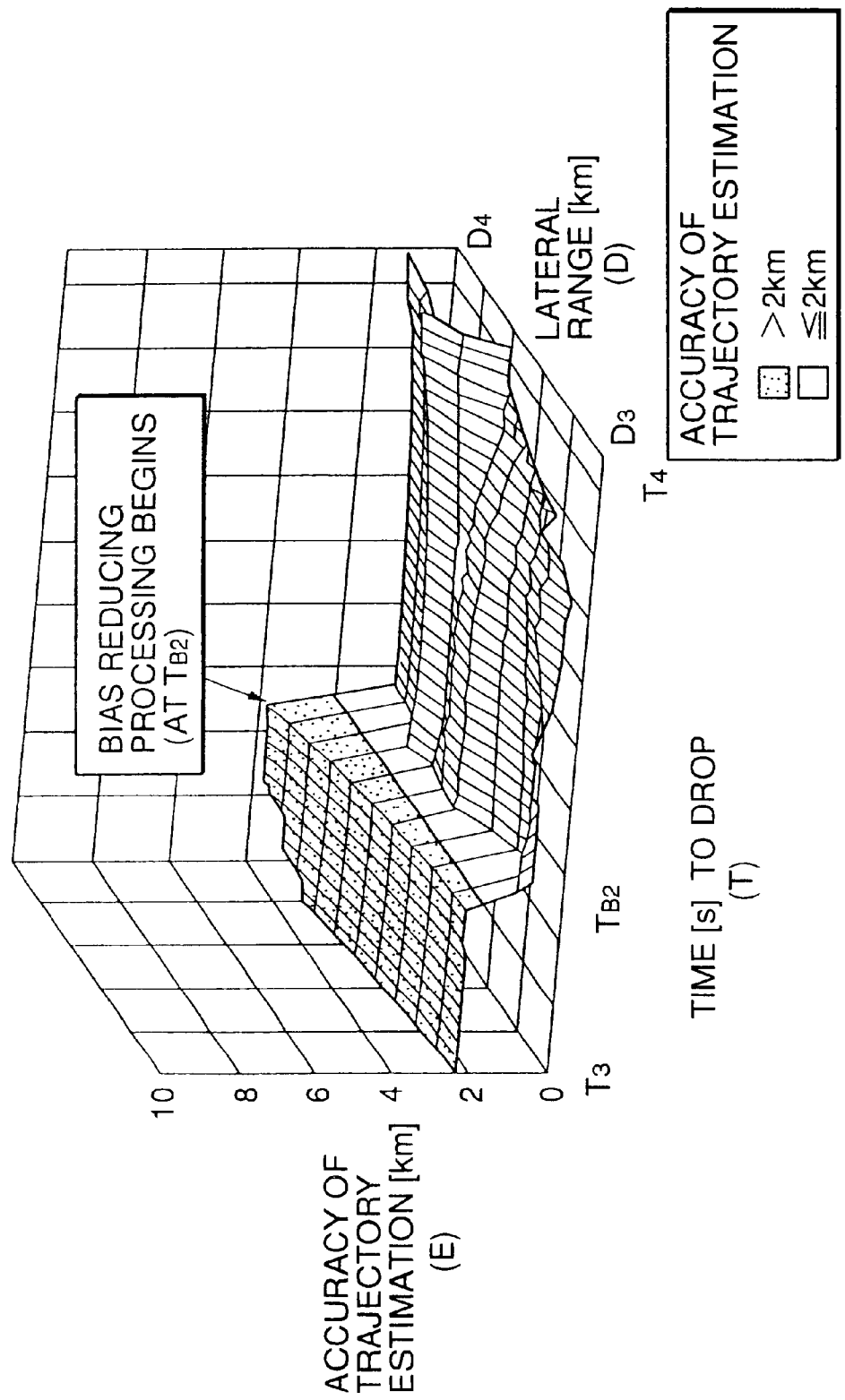
FIG. 15 is a diagram showing the results of estimation analyses of the accuracy of trajectory estimation of a long range rocket using a preferred embodiment of a rocket trajectory estimating method according to the present invention.

FIG. 15 shows the results of the estimation analyses for the accuracy of trajectory estimation of the long range rocket 2 in the range of from $D_3$ km to $D_4$ km using the lateral range (D) of the tracking system 1 as a parameter. In FIG. 15, the accuracy of trajectory estimation is distinguished by color. The colorless portion means that the accuracy is less than 2 km. The sprinkled portion means that the accuracy is 2 km or more. It can be seen from FIG. 15 that the accuracy of trajectory estimation is less than 2 km after the bias reducing processing begins at $T_{B2}$, so that the accuracy is considerably improved.

A rocket future-position predicting method according to the present invention will be described below. The true trajectory of the rocket 2 finally estimated by the above described rocket trajectory estimating method of the present invention has very high accuracy. Therefore, if the track of the rocket 2 flying along the estimated true trajectory is analyzed, the present position of the rocket 2 can not only be estimated, but the future position and future-position drop time of the rocket 2 can also be predicted.

A rocket identifying method according to the present invention will be described below. The Kalman filter 13 outputs the estimated values of orbital elements of the rocket true trajectory finally estimated by the above described rocket trajectory estimating method of the present invention, and the outputted estimated values of orbital elements are compared with the values of orbital elements of various rocket trajectories, so that the rocket 2 can be identified.

A rocket situation detecting method according to the present invention will be described below. In the above described rocket trajectory estimating method according to the present invention, the estimated value of true acceleration of the rocket 2 is derived from the observation acceleration transmitted to the Kalman filter, and the estimated value of pseudo acceleration derived by the Kalman filter 13. That is:

$$\text{(True Acceleration Estimated Value)} = \text{(Observation Acceleration)} - \text{(Pseudo Acceleration Estimated Value)} \quad (11)$$

By this true acceleration estimated value of the rocket 2, the situation of the rocket 2 can be detected.

Figure 16:
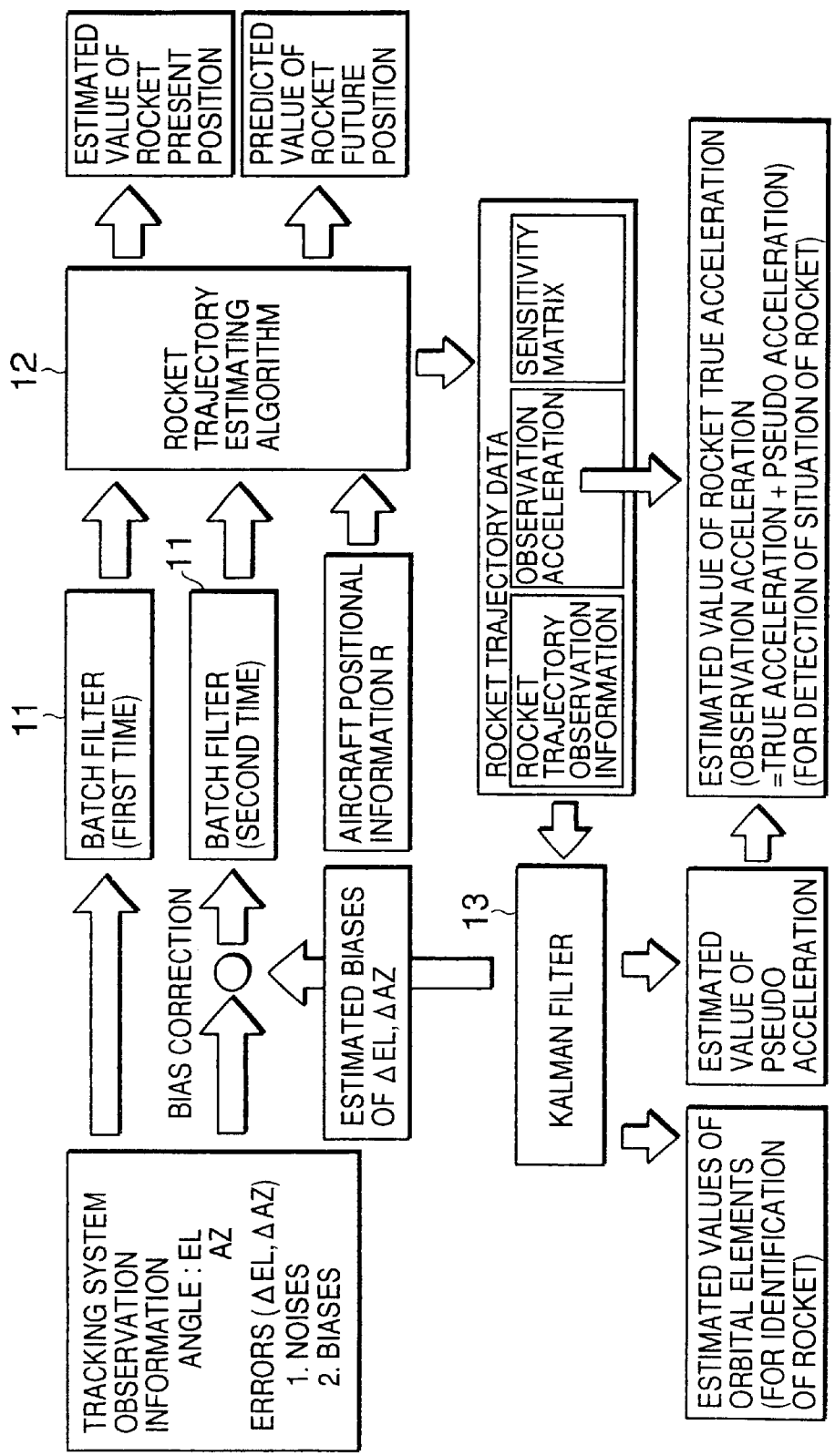
FIG. 16 is a chart showing the flow of the whole processing algorithm in a preferred embodiment of a rocket trajectory estimating method, a rocket future-position predicting method, a rocket identifying method and a rocket situation detecting method according to the present invention.

FIG. 16 shows the simplified flow of the whole processing algorithm of the rocket trajectory estimating method, the rocket future-position predicting method, the rocket identifying method and the rocket according to the present invention. These estimations are conducted simultaneously. According to this processing algorithm, noises and biases are reduced by the batch filter 11 and the Kalman filter 13, so that the accuracy of trajectory estimation of the rocket 2 is remarkably improved, in comparison with the conventional algorithm for estimating the trajectory of the rocket 2.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A rocket trajectory estimating method comprising the steps of:

measuring a GLOS angle of a flying rocket by a tracking system;

passing the resulting GLOS angle data through a batch filter to reduce noises;

estimating a rocket trajectory on the basis of said GLOS angle data, the noises of which have been reduced;

passing the resulting rocket trajectory data through a Kalman filter to estimate biases, and correcting said GLOS angle data by eliminating the biases estimated by the Kalman filter; and estimating said rocket trajectory again on the basis of the corrected GLOS angle data, the biases of which have been eliminated, and a positional information of said tracking system, wherein said Kalman filter estimates the biases on the basis of a pseudo change of a trajectory obtained by updating an extended state vector which includes bias state variables as well as rocket trajectory state variables according to a trajectory dynamics equation.

2. The rocket trajectory estimating method as set forth in claim 1, wherein said tracking system is an infrared tracking system of a passive ranging system.

3. The rocket trajectory estimating method as set forth in claim 1, wherein said batch filter sequentially generates batch data, which are generated by a GLOS vector prepared from said GLOS angle data of said tracking system every time, by replacing the oldest data with the newest data every time, and said batch data are inputted to a least square filter to reduce noises.

4. The rocket trajectory estimating method as set forth in claim 1, wherein said rocket trajectory data passed through said Kalman filter include a rocket trajectory observation information, an observation acceleration, and a sensitivity matrix.

5. A rocket future-position predicting method comprising the steps of:

measuring a GLOS angle of a flying rocket by a tracking system;

passing the resulting GLOS angle data through a batch filter to reduce noises;

estimating a rocket trajectory on the basis of said GLOS angle data, the noises of which have been reduced;

passing the resulting rocket trajectory data through a Kalman filter to estimate biases, and correcting said GLOS angle data by eliminating the biases estimated by the Kalman filter;

estimating said rocket trajectory again on the basis of the corrected GLOS angle data, the biases of which have been eliminated, and a positional information of said tracking system; and simulation-analyzing a track of said rocket flying along the finally estimated rocket trajectory to estimate a future position or future-position drop time of said rocket.

6. A rocket identifying method comprising the steps of:

measuring a GLOS angle of a flying rocket by a tracking system;

passing the resulting GLOS angle data through a batch filter to reduce noises;

estimating a rocket trajectory on the basis of said GLOS angle data, the noises of which have been reduced;

passing the resulting rocket trajectory data through a Kalman filter to estimate biases, and correcting said GLOS angle data by eliminating the biases estimated by the Kalman filter;

estimating said rocket trajectory again on the basis of the corrected GLOS angle data, the biases of which have been eliminated, and a positional information of said tracking system; and outputting estimated values of orbital elements of the finally estimated rocket trajectory from said Kalman filter, and identifying said rocket by comparing the outputted estimated values of orbital elements with values of orbital elements of various rocket trajectories.

7. A rocket situation detecting method comprising the steps of:

measuring a GLOS angle of a flying rocket by a tracking system;

passing the resulting GLOS angle data through a batch filter to reduce noises;

estimating a rocket trajectory on the basis of said GLOS angle data, the noises of which have been reduced;

passing the resulting rocket trajectory data through a Kalman filter to estimate biases; and deriving an estimated value of true acceleration of said rocket on the basis of an observation acceleration, which is included in said rocket trajectory data transmitted to said Kalman filter, and an estimated value of pseudo acceleration obtained by said Kalman filter, to detect a situation of said rocket on the basis of said estimated value of said true acceleration.

* * * * *